(12) United States Patent
Park (10) Patent No.: US 10,399,558 B2
(45) Date of Patent: Sep. 3, 2019

(54) HYBRID VEHICLE AND CONTROL METHOD OF GEAR SHIFT THEREFOR

(71) Applicants: Hyundai Motor Company, Seoul (KR); Kia Motors Corporation, Seoul (KR)

(72) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 68 days.

(21) Appl. No.: 15/852,575

(22) Filed: Dec. 22, 2017

(65) Prior Publication Data

US 2019/0001962 A1  Jan. 3, 2019

(30) Foreign Application Priority Data

Jun. 30, 2017  (KR) .................. 10-2017-0083490

(51) Int. Cl.
*B60W 20/30* (2016.01)
*B60W 20/15* (2016.01)

(52) U.S. Cl.
CPC ............ *B60W 20/30* (2013.01); *B60W 20/15* (2016.01); *B60W 2510/0604* (2013.01); *B60W 2510/1005* (2013.01); *B60W 2520/10* (2013.01); *B60W 2710/0666* (2013.01)

(58) Field of Classification Search
None
See application file for complete search history.

(56) References Cited

U.S. PATENT DOCUMENTS

| | | | | |
|---|---|---|---|---|
| 6,022,290 | A * | 2/2000 | Lyon .................. | B60K 6/12 477/108 |
| 7,950,485 | B2 * | 5/2011 | Fukumura ............ | B60K 6/365 180/65.7 |
| 8,808,141 | B2 * | 8/2014 | Shelton ................ | B60W 20/10 477/5 |
| 9,545,912 | B2 * | 1/2017 | Takano ................ | B60K 6/36 |
| 2017/0043760 | A1 * | 2/2017 | Nefcy .................. | B60W 10/06 |
| 2017/0297554 | A1 * | 10/2017 | Lee ...................... | B60W 10/06 |

* cited by examiner

Primary Examiner — Dirk Wright
(74) Attorney, Agent, or Firm — Mintz Levin Cohn Ferris Glovsky and Popeo, P.C.; Peter F. Corless (57) ABSTRACT

A hybrid vehicle and a control method of gear shift therefor are provided. The hybrid vehicle and the control method of gear shift therefor minimize torque fluctuation during gear shift to enhance driving force and fuel efficiency. The method includes predicting a time point when gear shift occurs and estimating an intervention amount of the gear shift. Engine torque corresponding to the estimated intervention amount is then reduced up to the time point when the gear shift occurs and motor torque corresponding to the reduced engine torque is increased up to the time point when the gear shift occurs.

19 Claims, 7 Drawing Sheets

HYBRID VEHICLE AND CONTROL METHOD OF GEAR SHIFT THEREFOR

CROSS-REFERENCE TO RELATED APPLICATION(S)

This application claims the benefit of Korean Patent Application No. 10-2017-0083490, filed on Jun. 30, 2017, which is hereby incorporated by reference as if fully set forth herein.

BACKGROUND

Field of the Invention

The present invention relates to a hybrid vehicle and a control method of gear shift therefor, and more particularly, to a hybrid vehicle and a control method of gear shift therefor for minimizing torque fluctuation during gear shift to enhance driving force and fuel efficiency.

Discussion of the Related Art

Recently, with continued demand for improvement of fuel efficiency of vehicles and regulations regarding emissions from vehicles, demand for environmentally friendly vehicles has increased. As a practical representative thereof, hybrid electric vehicles (HEVs) and plug-in hybrid electric vehicles (PHEVs) have been developed.

A hybrid vehicle operates using two power sources including an engine and a motor. For harmonious operation of the engine and the motor, optimal output and torque may be generated. A hybrid vehicle is classified into a plurality of types based on an arrangement relationship between an engine and a motor and, thereamong, there is a rear axle mounted electric drive (RMED) method of connecting an engine and a motor to different drive shafts. In the RMED method, an electric motor is connected to a portion of a driving wheel to enable four-wheel drive, which will be described with reference to FIG. 1 according to the related art.

Figure 1:
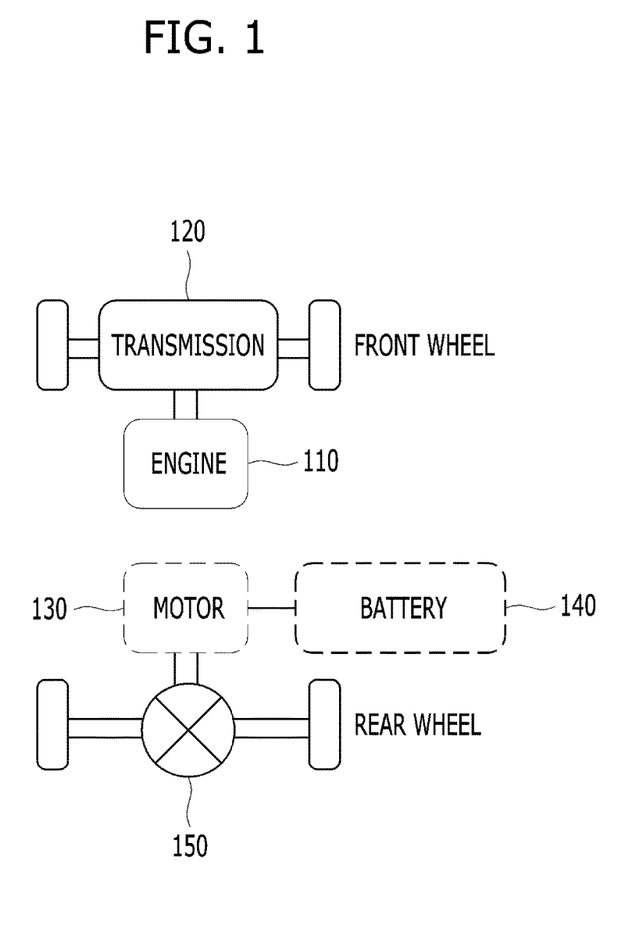
FIG. 1 is a diagram showing an example of a structure of a powertrain of a rear axle mounted electric drive (RMED) type hybrid vehicle according to the related art.

FIG. 1 is a diagram showing an example of a structure of a powertrain of an RMED type hybrid vehicle. FIG. 1 shows a powertrain of a hybrid vehicle employing an RMED method in which an internal combustion engine (ICE) 110 transmits driving force to a front wheel through a transmission 120 and an electric motor 130 is driven by receiving power from a battery 140 to transmit driving force to a rear wheel through a differential gear 150. The vehicle operates in a front-wheel drive manner when only the engine 110 is driven, operates in a rear-wheel drive manner when only the electric motor 130 is driven, and operates in a four-wheel drive manner when the engine 110 and the electric motor 130 are simultaneously driven.

In general, the transmission 120 is a stepped transmission or a multiple plate clutch, e.g., a dual clutch transmission (DCT), and performs shift-up to a second stage based on speed and torque after starting in a first stage. In particular, a vehicle performs control of reducing kinetic energy of a transmission input shaft, i.e., speed, by reducing torque of a driving source for smooth gear shift and protection of a clutch during shift-up and, in this regard, the control is referred to as "intervention control". The intervention control will be described in more detail with reference to FIG. 2.

Figure 2:
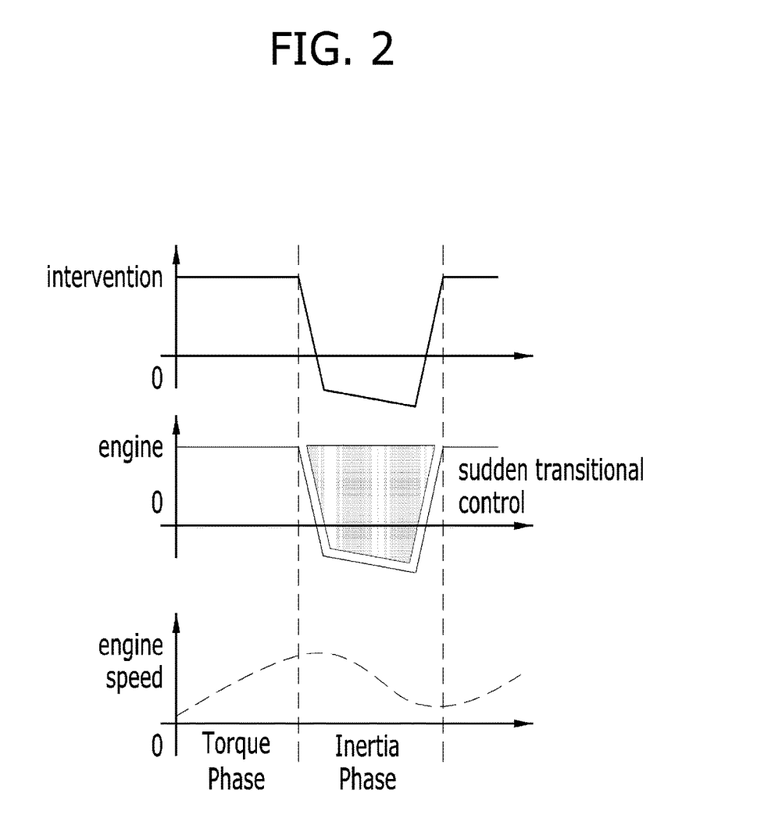
FIG. 2 is a diagram showing of an example of an intervention procedure for shift-up in a general vehicle according to the related art.

FIG. 2 is a diagram showing of an example of an intervention procedure for shift-up in a general vehicle according to the related art. FIG. 2 shows three graphs and, here, the vertical axis indicates intervention, engine torque, and speed of a transmission input shaft, from top to bottom.

A gear shift procedure is broadly classified into a torque phase and an inertia phase and, in particular, the torque phase refers to a phase in which speed of an input shaft is enhanced by positive (+) torque generated from an engine. The inertia phase refers to a phase in which engine torque is decreased to reduce speed of a transmission input shaft. To decrease engine torque for gear shift intervention control, air flow control and firing angle control may be considered, which will be described below.

First, air flow control refers to a method of adjusting a currently introduced air flow and fuel amount to adjust output torque. The present control method advantageously enhances ignition efficiency via optimum firing angle control corresponding to the current air flow and fuel amount but it is almost impossible to accurately control the introduced air flow and fuel amount to satisfy requested torque due to fluid behavior characteristics and, accordingly, there is a limit in torque fluctuation responsiveness. As a result, the current control method has high efficiency but needs to withstand errors of requested-torque tracking and response leg.

The firing angle control refers to a method in which efficiency is considered less for requested-torque tracking and, here, a greater amount of air flow and fuel amount than an amount required for an engine cylinder are first ensured (e.g., torque reserve) for achieving requested torque in consideration of a sluggish fluid behavior. For firing angle retardation of a spark plug to achieve torque required given the excessively ensured air flow and fuel amount, efficiency is degraded but torque precision and responsiveness are ensured.

As a result, generally, gear shift intervention control is embodied via firing angle control for rapid responsiveness of engine torque reduction. However, as described above, when firing angle control is performed, a fuel injection quantity is the same as in normal control but engine output is reduced, and thus, there is a problem in terms of reduced fuel efficiency. Irrespective of a control method of reduction in engine torque, engine torque is decreased by gear shift intervention control and wheel torque is also decreased and, thus, there is a problem in that a passenger inevitably experiences a torque difference during gear shift.

SUMMARY

An object of the present invention is to provide a hybrid vehicle and a control method of gear shift therefor for effectively shifting gears. In particular, the present invention provides a hybrid vehicle and a control method of gear shift therefor for enhancing engine efficiency and drivability during gear shift.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a control method of gear shift of a hybrid vehicle may include predicting a time point when gear shift occurs and estimating an intervention amount of the gear shift, reducing engine torque that corresponds to the estimated intervention amount up to the time point when the gear shift occurs, and increasing motor torque that corresponds to the reduced engine torque up to the time point when the gear shift occurs.

In another aspect of the present invention, a hybrid vehicle may include an engine controller configured to an engine, a motor controller configured to operate an electric motor, and a hybrid controller configured to predict a time point when gear shift occurs and to estimate an intervention amount of the gear shift, to operate the engine controller to reduce engine torque that corresponds to the estimated intervention amount up to the time point when the gear shift occurs, and to operate the motor controller to increase motor torque that corresponds to the reduced engine torque up to the time point when the gear shift occurs.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described in detail so as for those of ordinary skill in the art to easily implement with reference to the accompanying drawings. However, the present invention may be implemented in various different forms and is not limited to these exemplary embodiments. To clearly describe the present invention, a part without concerning to the description is omitted in the drawings, and like reference numerals in the specification denote like elements. The same reference numbers will be used throughout the drawings and the specification to refer to the same parts.

An exemplary embodiment of the present invention proposes the feature of minimizing rapid fluctuation in engine torque and reduction in driving force during gear shift by pre-distributing engine and motor power prior to gear shift to enhance gear shift efficiency and shift quality of a stepped transmission in a hybrid vehicle (e.g., a rear axle mounted electric drive (RMED) method) including a powertrain with a motor being connected directly to a drive shaft.

Figure 3:
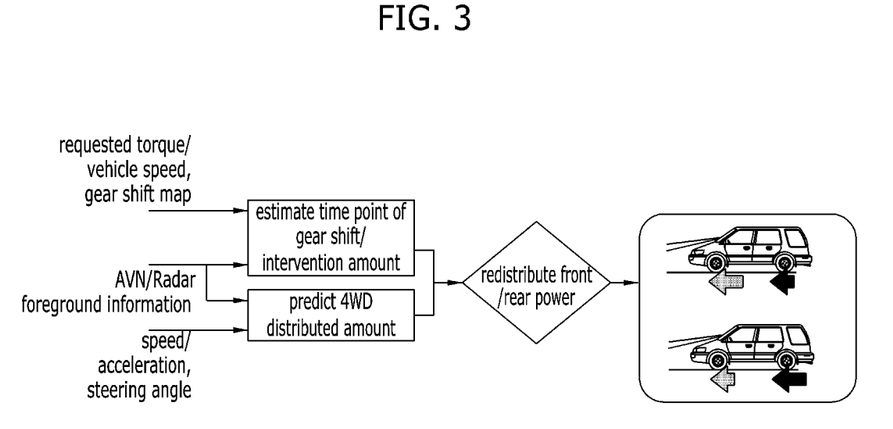
FIG. 3 is a diagram for schematic explanation of a concept of distribution of driving force for effective gear shift in a hybrid vehicle according to an exemplary embodiment of the present invention.

A concept of distribution of driving force according to an exemplary embodiment of the present invention will be described below with reference to FIG. 3. FIG. 3 is a diagram for schematic explanation of a concept of distribution of driving force for effective gear shift in a hybrid vehicle according to an exemplary embodiment of the present invention.

Referring to FIG. 3, a hybrid vehicle including the powertrain shown in FIG. 1 is configured to estimate a gear shift time point and an intervention amount and to predict distributed amounts of driving forces to respective front and rear wheels to rearrange driving forces of an engine and a motor, i.e., power of front and rear wheels.

In particular, to estimate the gear shift time point and the intervention amount, foreground information acquired through 1) requested torque/vehicle speed and gear shift map according thereto and 2) a navigation device, radar, or the like of an audio/video/navigation (AVN) system may be used. In addition, the foreground information acquired through the navigation device, radar, or the like of the AVN system may be used to predict distributed amounts of driving forces of respective front and rear wheels with information on speed/acceleration, a steering angle, and the like.

Figure 4:
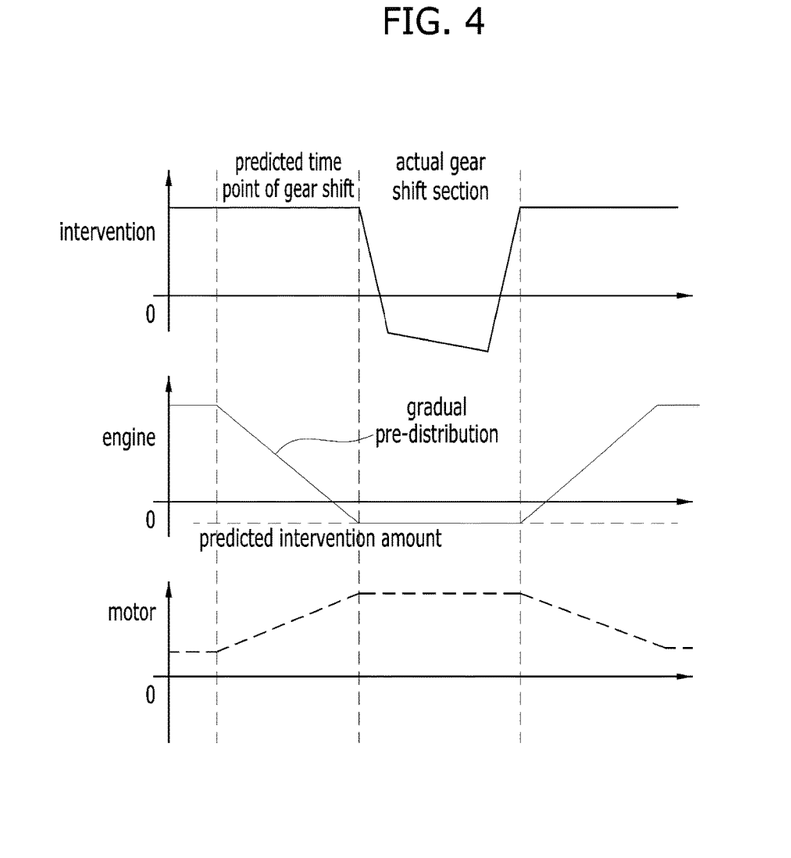
FIG. 4 is a diagram showing an example of gear shift control via driving force distribution according to an exemplary embodiment of the present invention.

When gear shift control is performed based on the concept of distribution of driving forces, which is described above with reference to FIG. 3, will be described below with reference to FIG. 4. FIG. 4 is a diagram showing an example of gear shift control via driving force distribution according to an exemplary embodiment of the present invention. FIG. 4 shows three graphs and, here, the vertical axis indicates intervention, engine torque, and torque of an electric motor, from top to bottom.

Referring to FIG. 4, when gear shift is predicted to occur in a vehicle, an intervention amount of corresponding gear shift may also be predicted. Accordingly, an engine may gradually distribute a torque reduction amount that corresponds to the predicted intervention amount from a time point when gear shift is predicted to occur until actual gear shift occurs. To compensate for the engine torque reduction amount, an electric motor may gradually increase torque that corresponds to the reduced engine torque from a time point in which gear shift is predicted to occur until actual gear shift occurs. Accordingly, torque fluctuation amounts of the engine and the electric motor may be restored as actual gear shift is completed.

The engine torque is pre-reduced by the predicted intervention amount when a current section reaches an actual gear shift section and, thus, the engine needs not perform excessive firing angle control, thereby enhancing fuel efficiency. In addition, torque of the electric motor is gradually increased by gradual reduction in the engine torque and, thus, total driving force may be maintained, thereby enhancing drivability.

Figure 5:
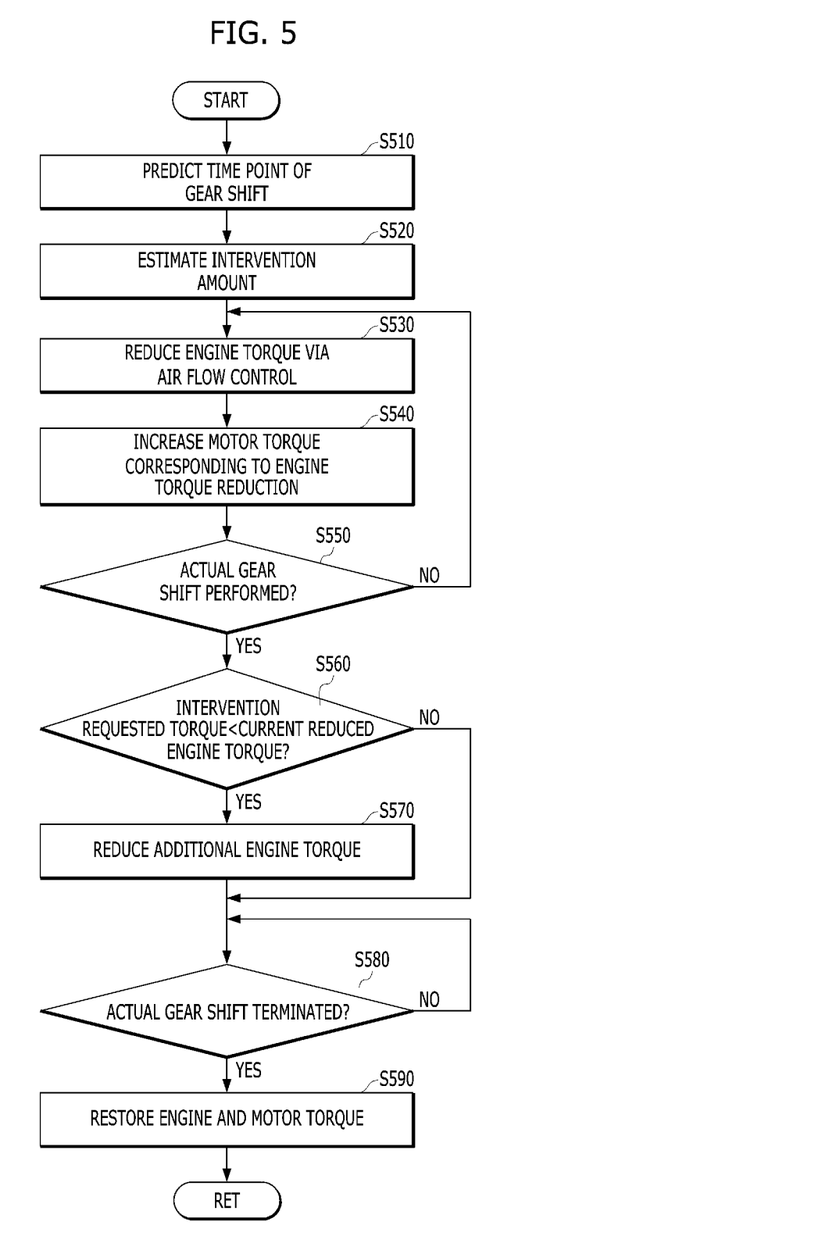
FIG. 5 is a flowchart showing an example of a gear shift control procedure according to an exemplary embodiment of the present invention.

The aforementioned gear shift procedure is shown in a flowchart of FIG. 5. FIG. 5 is a flowchart showing an example of a gear shift control procedure according to an exemplary embodiment of the present invention. The method described herein below may be executed by a controller of the vehicle having a processor and a memory. Referring to FIG. 5, first, a time point of gear shift may be predicted (S510). The time point of gear shift may be predicted based on current APS (and/or requested torque based thereon) and current vehicle speed. A detailed prediction method will be described in more detail with reference to FIG. 6.

When the time point of gear shift is predicted, an intervention amount of gear shift that will occur at the corresponding time point may be estimated (S520). The intervention amount may be estimated based on information on APS, vehicle speed, a current gear stage, and the like. Based on the estimated intervention amount, engine torque reduction may be performed (S530). In particular, a time point when actual gear shift occurs is predicted and a torque reduction amount is gradually distributed and, thus, an air flow control method with greater efficiency than firing angle control may be applied to engine torque reduction.

With engine torque reduction, torque of an electric motor that corresponds to the reduced torque may be increased (S540). Then, while actual gear shift is performed (S550), when actual intervention requested torque is less than the current reduced engine torque (S560), engine torque reduction may be further performed (S570). In particular, rapid requested-torque tracking is required and, thus, torque reduction may be performed via firing angle control.

When current engine torque is decreased to be equal to or less than actual intervention requested torque, an additional engine torque reduction procedure may be omitted and, when actual gear shift is completed (S580), torque of the engine and torque of an electric motor may be restored (S590). In particular, the restoration may refer to restoration to torque control that corresponds to APS without consideration of intervention control but not restoration of torque prior to prediction of whether gear shift occurs.

Figure 6:
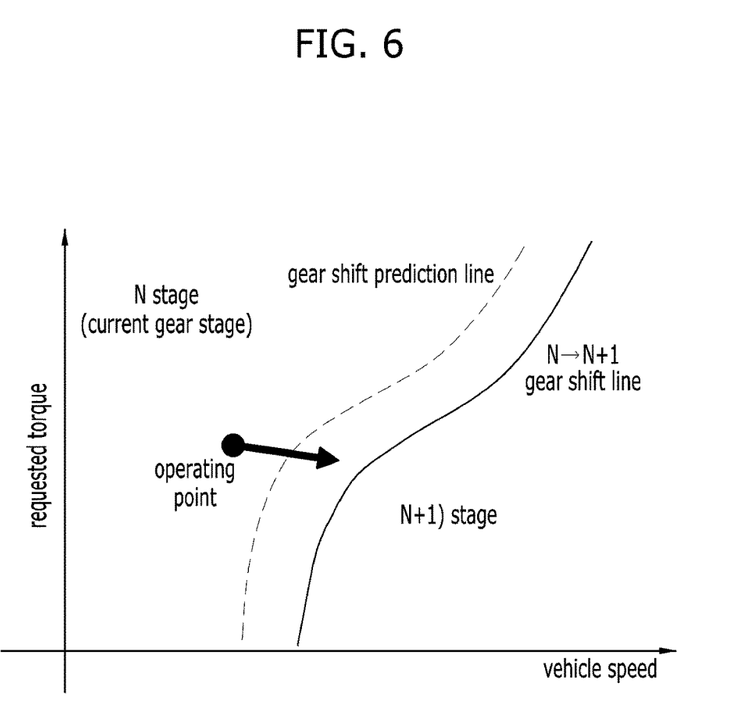
FIG. 6 is a diagram showing an example of a matching line using proximity according to another aspect of an exemplary embodiment of the present invention.

Hereinafter, a method of predicting whether gear shift occurs will be described with reference to FIG. 6. FIG. 6 is a diagram showing an example of a method of predicting whether gear shift occurs using a mapping line according to an exemplary embodiment of the present invention. Referring to FIG. 6, whether gear shift occurs in the foreseeable future may be predicted based on a mapping line of current torque and gear shift. In particular, a mapping line (i.e., "gear shift prediction line") with slightly lower vehicle speed than in an actual gear shift-up (N->N+1) line may be previously set. The gear shift prediction line may be a reference speed, a value of which is changed based on torque, and may refer to speed at which gear shift is predicted to occur in the foreseeable future based on current requested torque. Use of the gear shift prediction line may be created in that, when a current operating point (which is determined based on vehicle speed and requested torque) reaches the gear shift prediction line, the possibility that the operating point reaches the actual gear shift-up line in the foreseeable future is increased.

Figure 7:
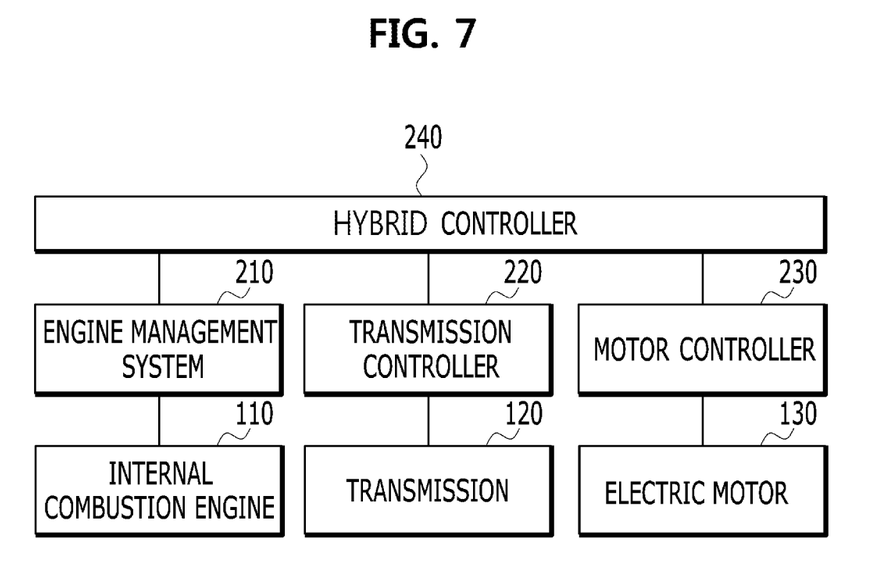
FIG. 7 is a block diagram showing an example of a control system of a hybrid vehicle to which exemplary embodiments of the present invention are applicable.

Hereinafter, a control system of a hybrid vehicle to which the aforementioned control method of gear shift will be described. FIG. 7 is a block diagram showing an example of a control system of a hybrid vehicle to which exemplary embodiments of the present invention are applicable. Referring to FIG. 7, in the hybrid vehicle to which exemplary embodiments of the present invention are applicable, an internal combustion engine 110 may be operated by an engine controller 210. The engine controller 210 may also be referred to as an engine management system (EMS, or engine controller). The transmission 120 may be operated by a transmission controller 220. Torque of the electric motor 130 may be adjusted by a motor control unit (MCU, or motor controller) 230.

Each controller may be connected to a central or overall controller 240 (hereinafter referred to as a hybrid controller or a hybrid control unit (HCU)) executed to execute an overall operation of a powertrain in the hybrid vehicle as a high-level controller and may provide information required to switch driving modes and to shift gears to the hybrid controller 240 or may perform an operation based on a control signal transmitted from the hybrid controller 240 under control of the hybrid controller 240. For example, the hybrid controller 240 may be configured to determine operation states of electric motors 130 through the MCU 230 and transmit torque commands for the respective states to the MCU 230. In particular, the hybrid controller 240 may be configured to perform each of the aforementioned procedures of FIG. 5.

It would be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may distribute and provide the corresponding function.

Figure 8:
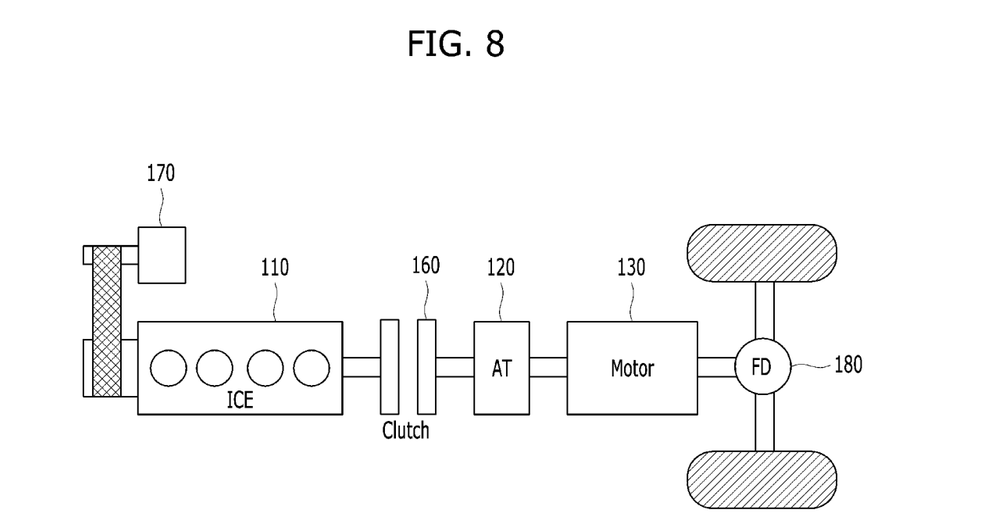
FIG. 8 is a diagram showing an example of a structure of a hybrid vehicle to which the control method of gear shift according to the exemplary embodiments of the present invention is applicable.

The aforementioned present disclosure is assumed to be applied to a hybrid vehicle that employs an RMED e4WD method but may be applied to any hybrid powertrain system with an electric motor connected to a driver shaft instead of using a multi-stage transmission. For example, there may be a parallel type hybrid system shown in FIG. 8 instead of the RMED type vehicle. FIG. 8 is a diagram showing an example of a structure of a hybrid vehicle to which the control method of gear shift according to the exemplary embodiments of the present invention is applicable.

FIG. 8 illustrates a powertrain of a hybrid vehicle employing a parallel type hybrid system including an engine clutch 160 installed between an internal combustion engine (ICE) 110 and the electric motor 130. In such a vehicle, in general, when a driver engages an accelerator (i.e., accelerator pedal sensor on) after turning on the vehicle, the motor 130 may be driven using power of a battery while the engine clutch 160 is open and power of the motor 130 may be transmitted to move wheels through a final drive 180 (i.e., an electric vehicle (EV) mode). As the vehicle gradually accelerates, high driving force is further required and, in particular, an auxiliary motor (or a starter generator motor 170) may be operated to drive the engine 110.

Accordingly, when rotational speeds of the engine 110 and an input end of the transmission 120 correspond to each other, the engine clutch 160 is then engaged such that both the engine 110 and the motor 130 drive the vehicle (i.e., transition to a hybrid electric vehicle (HEV) mode from an EV mode). When a predetermined engine off condition such as vehicle deceleration is satisfied, the engine clutch 160 is open and the engine 110 stops (i.e., transition to an EV mode from an HEV mode).

The aforementioned control method of gear shift may be also applied be the vehicle having the aforementioned structure since engine torque reduction is capable of being compensated for by torque of the motor 130 while gear shift intervention occurs. The aforementioned control method of gear shift via distribution of driving force may prevent degradation in drivability and engine efficiency due to intervention of engine torque during gear shift.

The hybrid vehicle configured as described above according to at least one exemplary embodiment of the present invention may effective control gear shift. In particular, engine torque intervention during gear shift may be offset by an electric motor to enhance engine efficiency during gear shift and torque fluctuation may also be minimized based on a whole vehicle to enhance drivability.

It will be appreciated by persons skilled in the art that that the effects that could be achieved with the present invention are not limited to what has been particularly described hereinabove and other advantages of the present invention will be more clearly understood from the above detailed description taken in conjunction with the accompanying drawings.

The aforementioned present invention can also be embodied as computer readable code stored on a non-transitory computer readable recording medium. The non-transitory computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and their equivalents.

What is claimed is:

1. A control method of gear shift of a hybrid vehicle, comprising:
    predicting, by a controller, a time point when gear shift occurs and estimating an intervention amount of the gear shift;
    reducing, by the controller, engine torque that corresponds to the estimated intervention amount up to the time point when the gear shift occurs; and
    increasing, by the controller, motor torque that corresponds to the reduced engine torque up to the time point when the gear shift occurs.

2. The method according to claim 1, further comprising: restoring, by the controller, the engine torque and the motor torque upon completing the gear shift.

3. The method according to claim 1, further comprising: after the gear shift begins, additionally reducing, by the controller, the engine torque when the reduced engine torque is greater than actual intervention requested torque.

4. The method according to claim 3, wherein the reducing of the engine torque is performed via air flow control of an engine; and wherein the additionally reducing of the engine torque is performed via firing angle control of the engine.

5. The method according to claim 1, wherein the time point when the gear shift occurs is predicted based on at least one selected from the group consisting of: a vehicle speed, an accelerator pedal manipulation degree, and a requested torque.

6. The method according to claim 5, wherein the time point when the gear shift occurs is predicted using a gear shift prediction line that is previously set with respect to the vehicle speed and the requested torque.

7. The method according to claim 1, wherein the intervention amount of the gear shift is estimated based on at least one selected from the group consisting of: an accelerator pedal manipulation degree, a vehicle speed, and a current gear stage.

8. The method according to claim 1, wherein an electric motor and an engine transmit power to different drive shafts.

9. The method according to claim 8, wherein the engine transmits driving force to a front wheel through a transmission and the electric motor transmits driving force to a rear wheel.

10. A non-transitory computer readable recording medium having recorded thereon a program for executing the method of claim 9.

11. A hybrid vehicle, comprising:
an engine controller configured to operate an engine;
a motor controller configured to operate an electric motor; and
a hybrid controller configured to predict a time point when gear shift occurs and to estimate an intervention amount of the gear shift, to operate the engine controller to reduce engine torque that corresponds to the estimated intervention amount up to the time point when the gear shift occurs, and to operate the motor controller to increase motor torque that corresponds to the reduced engine torque up to the time point when the gear shift occurs.

12. The hybrid vehicle according to claim 11, wherein the hybrid controller is configured to operate the engine controller and the motor controller to restore the engine torque and the motor torque upon completing the gear shift.

13. The hybrid vehicle according to claim 11, wherein the hybrid controller is configured to operate the engine controller to additionally reduce the engine torque when the reduced engine torque is greater than actual intervention requested torque after the gear shift begins.

14. The hybrid vehicle according to claim 13, wherein the engine controller is configured to reduce the engine torque via air flow control of the engine and additionally reduce the engine torque via firing angle control.

15. The hybrid vehicle according to claim 11, wherein the time point when the gear shift occurs is predicted based on at least one selected from the group consisting of: a vehicle speed, an accelerator pedal manipulation degree, and a requested torque.

16. The hybrid vehicle according to claim 15, wherein the time point when the gear shift occurs is predicted using a gear shift prediction line that is previously set with respect to the vehicle speed and the requested torque.

17. The hybrid vehicle according to claim 11, wherein the intervention amount of the gear shift is estimated based on at least one selected from the group consisting of: an accelerator pedal manipulation degree, a vehicle speed, and a current gear stage.

18. The hybrid vehicle according to claim 11, wherein the electric motor and the engine transmit power to different drive shafts.

19. The hybrid vehicle according to claim 18, wherein the engine transmits driving force to a front wheel through a transmission and the electric motor transmits driving force to a rear wheel.

* * * * *